(12) United States Patent
Hinde et al.

(10) Patent No.: US 7,359,978 B2
(45) Date of Patent: Apr. 15, 2008

(54) PROVIDING SECURE ACCESS THROUGH NETWORK FIREWALLS

(75) Inventors: Stephen J. Hinde, Redland (GB); Lawrence Wilcock, Malmesbury (GB); Colin Low, Wooton-Under-Edge (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 251 days.

(21) Appl. No.: 11/357,050

(22) Filed: Feb. 21, 2006

(65) Prior Publication Data

US 2006/0168260 A1   Jul. 27, 2006

Related U.S. Application Data

(63) Continuation of application No. 09/655,367, filed on Sep. 5, 2000, now abandoned.

(30) Foreign Application Priority Data

Sep. 4, 1999   (GB) ................... 9920834.0

(51) Int. Cl.
*G06F 15/16*   (2006.01)
*G06F 15/173*   (2006.01)

(52) U.S. Cl. .................. 709/229; 709/225; 726/11

(58) Field of Classification Search ............... 709/225, 709/229, 219; 726/11
See application file for complete search history.

(56) References Cited

U.S. PATENT DOCUMENTS 5,944,823 A   8/1999   Jade et al.
6,134,584 A   10/2000   Chang et al.
6,169,992 B1   1/2001   Beall et al.

FOREIGN PATENT DOCUMENTS

GB   2 323 757 A   9/1998
WO   WO 97/19415   11/1996

OTHER PUBLICATIONS

Kassapidis, Panayiotis. "FIN_WAIT_2 connections on HP system," Feb. 1999.

(Continued)

*Primary Examiner*—Larry D Donaghue

(57) ABSTRACT

To enable controlled, secure connections using a versatile protocol such as TCP/IP to be established through a firewall and proxy server, the versatile protocol is tunnelled using HTTP. Client to server communications are effected using an HTTP POST operation. Server to client communications are effected using an HTTP GET operation to establish a tunnelled socket; this socket is closed within an interval less than any timeout imposed by the proxy server and immediately re-established by another GET operation, irrespective of whether data continue to be pending for communication to the client. A globally-unique ID is included in each POST and GET message to enable related messages to be recognized.

5 Claims, 5 Drawing Sheets

Client ← Service

1. Generate GUID

Client

Server

OTHER PUBLICATIONS

Apache. "Apache HTTP Server Version 1.3: Connections in the FIN_WAIT_2 state and Apache," Jun. 1999.

Aline, Mary et al. "Burrowing through firewalls," Dec. 1996.

Fielding, R. et al. "Hypertext Transfer Protocol—HTTP/1.1" (RFC2616), Jun. 1999. §3.11 and §13.3.2-13.3.3.

Frantz, Bill. "Tunnelling Thru Firewalls," Sep. 1998 http://www.erights.org/elib/distrib/vattp/DataCommThruFirewalls.html.

Quicktime. "Tunnelling RTS and RTP over HTTP," Aug. 2003 http://developer.apple.com/documentation/QuickTime/QTSS/Concepts/chapter_2_section_14.html.

Jacobson, Moshe et al. "Htun: Providing IP Service Over an HTTP Proxy." (no date).

Menezes, Alfred et al. Handbook of Applied Crypotography, 1997 CRC Press LLC, §10.3.1.

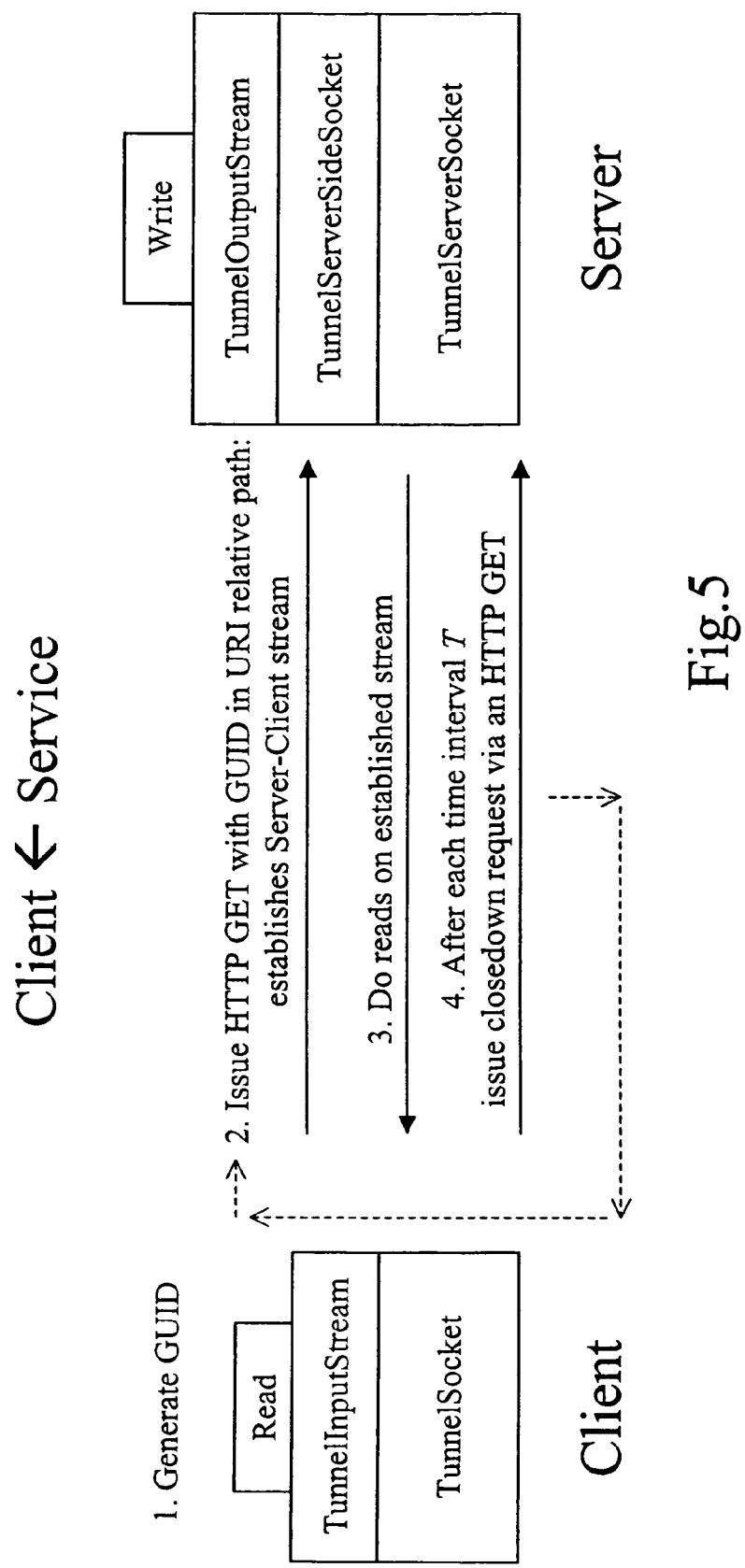

PROVIDING SECURE ACCESS THROUGH NETWORK FIREWALLS

RELATED APPLICATIONS

The present application is a continuation of U.S. application Ser. No. 09/655,367 filed Sep. 5, 2000 now abandoned, which is based on, and claims priority from, Great Britain Application Number 9920834.0, filed Sep. 4, 1999, the disclosures of which are hereby incorporated by reference herein in their entirety.

TECHNICAL FIELD

This invention relates to methods and apparatus for providing secure access between a service external to a network firewall (such as a web page server) and a client internal to the firewall (such as a web browser).

BACKGROUND ART

Facilities for global access to information, such as the World Wide Web, are undergoing immense growth and expansion, both in volume of data transferred and in sophistication of tools, such as web browsers, for accessing those data. This in turn requires the flexibility and capability of the data network infrastructure to be increased, without at the same time jeopardizing its security features. Often these objectives conflict.

Web based applications are "client-server" in nature. A client-based browser runs on an end user's computer, communicating via network links with a web server operated by a service provider. The server provides data defining the content of web pages which are rendered and displayed by the user's browser; typically the web page content is defined using a markup language such as Hypertext Markup Language (HTML). The communications between the browser and the web server are conducted in accordance with a protocol called Hypertext Transfer Protocol (HTTP), defined in the Internet Engineering Task Force's RFC 1945. HTTP is a simple text-based protocol that has the peculiar quality that messages conforming to it are trusted and allowed to pass around the internets, intranets and extranets that make up today's "Internet". This Internet is really a series of closely coupled networks linked together through "firewalls": network nodes that allow controlled, restricted access between two networks. However the ability to "browse the world wide web" is seen as a universal common denominator, and as such HTTP messages are allowed to pass through these firewalls unchecked. There have been a number of enhancements to the HTTP protocol: the description herein relates by way of example to the basic version, HTTP/1.0, which is supported universally and with which later versions of HTTP are backwards compatible. Nonetheless the invention is not limited to use with HTTP/1.0 or indeed any other specific version of HTTP, and the claims hereof should be construed accordingly.

Web pages defined using the markup language can be enhanced by the use of code written in the Java programming language; this allows dynamic content and interactivity to be added to web pages. Java components can run either on the server end of the network connection, as "servlets", or on the client browser machine, in which case they are known as "applets". Many potential security problems were envisaged with the introduction of applets, such as "viruses" and "trojan horses", so a tight set of security restrictions were imposed on what applets could and could not do. To this end applets are executed on the client machine in a controlled environment called a "sandbox". This sandbox defines how the applet can interact with the resources available in the computational platform the applet is running on, via a limited application programming interface (API). For example, the applet typically cannot interact with the local disk, nor connect to other computers on the network in unrestricted fashion. However the applet can typically connect back to the web server it was served from, although by way of an HTTP connection only. References to Java herein relate by way of example to Java/1.1 which is widely deployed; later versions of Java provide enhanced network support, but are backwards compatible with this base version.

The first generation of web content was mainly very static in nature—like pages from a magazine with text and pictures. The second generation of web content became increasingly dynamic, providing a user interface for applications, such as database queries. The third generation of web content is becoming increasingly interactive, with real-time communications, such as video, text chat and Internet Telephony, being added as an integral part. Internet-based client-server applications normally operate by opening "sockets" between the client and server, using Transaction Control Protocol/Internet Protocol (TCP/IP). TCP/IP sockets provide bi-directional, reliable communications paths. These can be used to implement dynamic or interactive client-server based applications, such as are required by the second and third generations of web content.

However, these more sophisticated applications pose a problem, in that the communications protocols they often require for interaction with the web server, such as TCP/IP, are intentionally barred by firewalls and proxy servers. It is therefore an object of this invention to provide clients, such as Java applets in a sandbox, with some controlled ability (within the context of a specific web-based application) to interact through a firewall with other resources, such as web servers, using protocols in addition to HTTP.

DISCLOSURE OF INVENTION

According to one aspect of this invention there is provided a method of permitting secure access between a service external to a network firewall and a client internal to the firewall, comprising the steps of:
 (a) effecting an HTTP GET operation or equivalent thereof (which may be in a protocol functionally equivalent to HTTP) from the client to establish a communications socket for communicating data from the service to the client;
 (b) after a predetermined interval effecting another GET operation or equivalent thereof to close the communications socket, irrespective of whether access between the service and the client is required to continue; and
 repeating steps (a) and (b) while access between the service and the client is required to continue.

The HTTP Tunneling Socket described herein as an example of this invention is a socket that operates on top of the HTTP protocol. For interaction with a Java-based application it provides the standard APIs as defined for a socket in the Java/1.1 API specification. For interaction with the network it uses the HTTP/1.0 protocol. This technique in which one protocol is carried in messages conveyed over another protocol is known as tunneling. The use of tunneling has two benefits. It allows the tunnel to be executed in the browser sandbox, since the APIs for accessing an HTTP connection to a web server do not have any security restrictions. Secondly it allows the client-server connection to traverse firewalls between intranets and internets, as HTTP is the protocol that all firewalls allow to pass through them.

The Java applet and the server are thus provided with a connection protocol (such as TCP/IP) which is more versatile and capable than the HTTP connection to which they would normally be limited by the firewall and/or proxy server. However, the restrictions imposed by the sandbox prevent malicious or inappropriate access to the client machine's resources through the tunnelled protocol.

BRIEF DESCRIPTION OF DRAWINGS

A method and apparatus in accordance with this invention, for permitting secure access between a client behind a firewall and a service provided by a node (such as a server) external to the firewall, will now be described, by way of example, with reference to the accompanying drawings, in which:

FIG. 5 shows in more detail the mechanism for communications from the server to the client.

BEST MODE FOR CARRYING OUT THE INVENTION, & INDUSTRIAL APPLICABILITY

There are in principle two aspects involving firewalls to be considered when establishing a connection between an applet in a user's terminal and a web server. The first aspect is the case of a firewall-protected web server to which a browser running on a machine outside the firewall is trying to connect. This aspect does not present a serious problem since the web-server owner can configure the firewall to allow this connection to be made.

Figure 1:
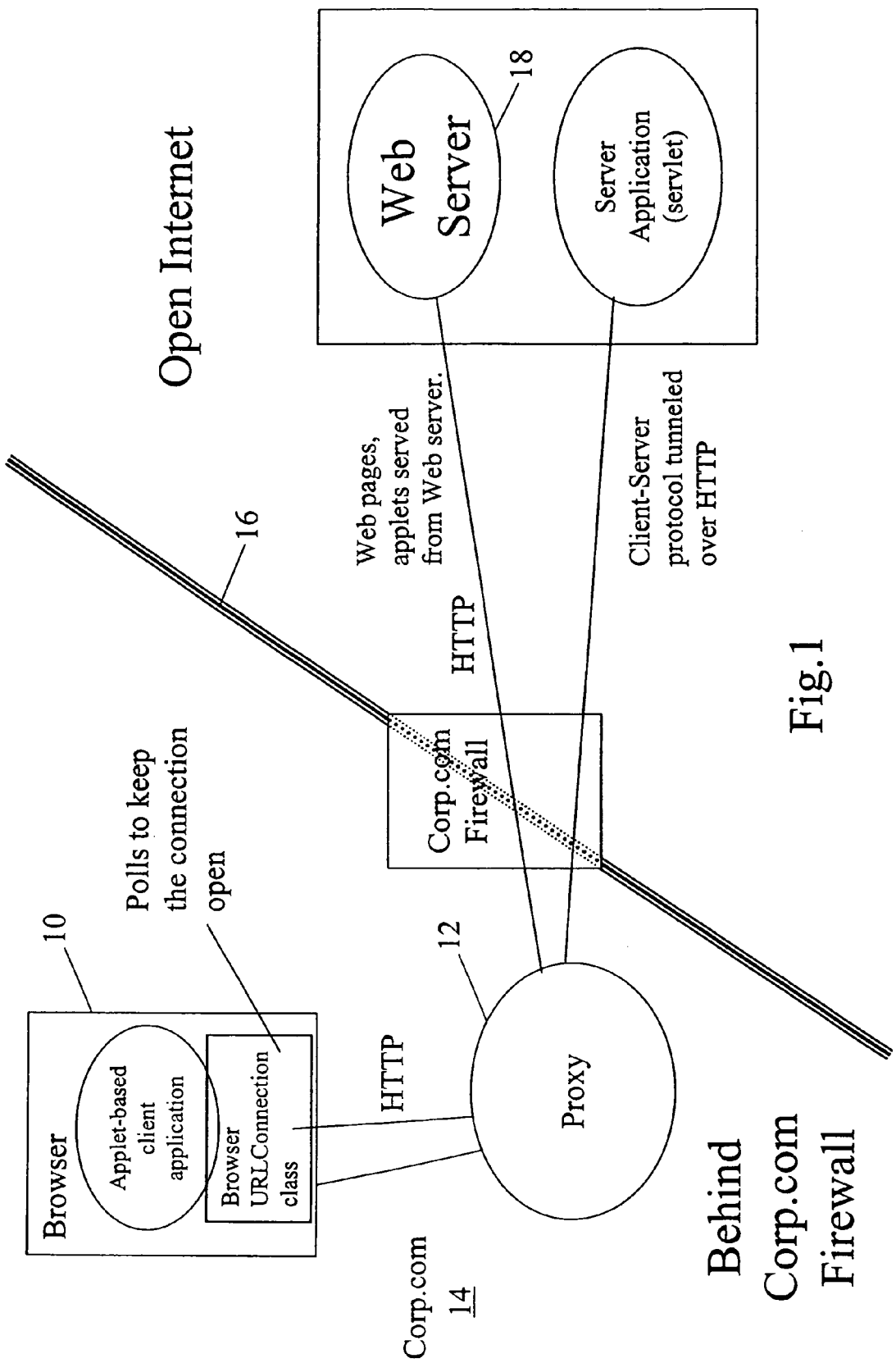
FIG. 1 is a schematic illustration of circumstances in which the invention can be used.

The second aspect is the case of a web browser machine in a corporate intranet trying to connect through the corporate firewall to a web server on the public Internet, as illustrated in FIG. 1. The problem here is that the web server owner has, by design, no control over the firewall. The complete scenario is that the browser 10 running java applet code on the user's terminal will connect initially to a machine 12 called a proxy within the corporate intranet 14. This proxy makes the required connections through the firewall 16 to the internet-based web server 18 on behalf of the browser 10, without exposing sensitive information about the browser and its host terminal to view in the public internet. The proxy 12 also performs various security checks, for example to ensure that the requests are valid HTTP requests.

However, because of the restriction to the use of HTTP, the web server is unable to provide desirable services to the client, such as real-time audio, video or interactive chat, which are possible with the use of more powerful protocols such as TCP/IP. These more powerful protocols are normally barred from unrestricted use because of the threat they pose of enabling inappropriate or intrusive access to resources within the corporate intranet.

This problem is overcome by using the invention to establish a "tunnel" through the firewall, carried by the HTTP messages, and thus open communications sockets which the Java applet and the web server can use to communicate with one another. In this way the web server is enabled to use resources on the browser's host machine, albeit still within the tight constraints imposed by the Java sandbox.

Figure 2:
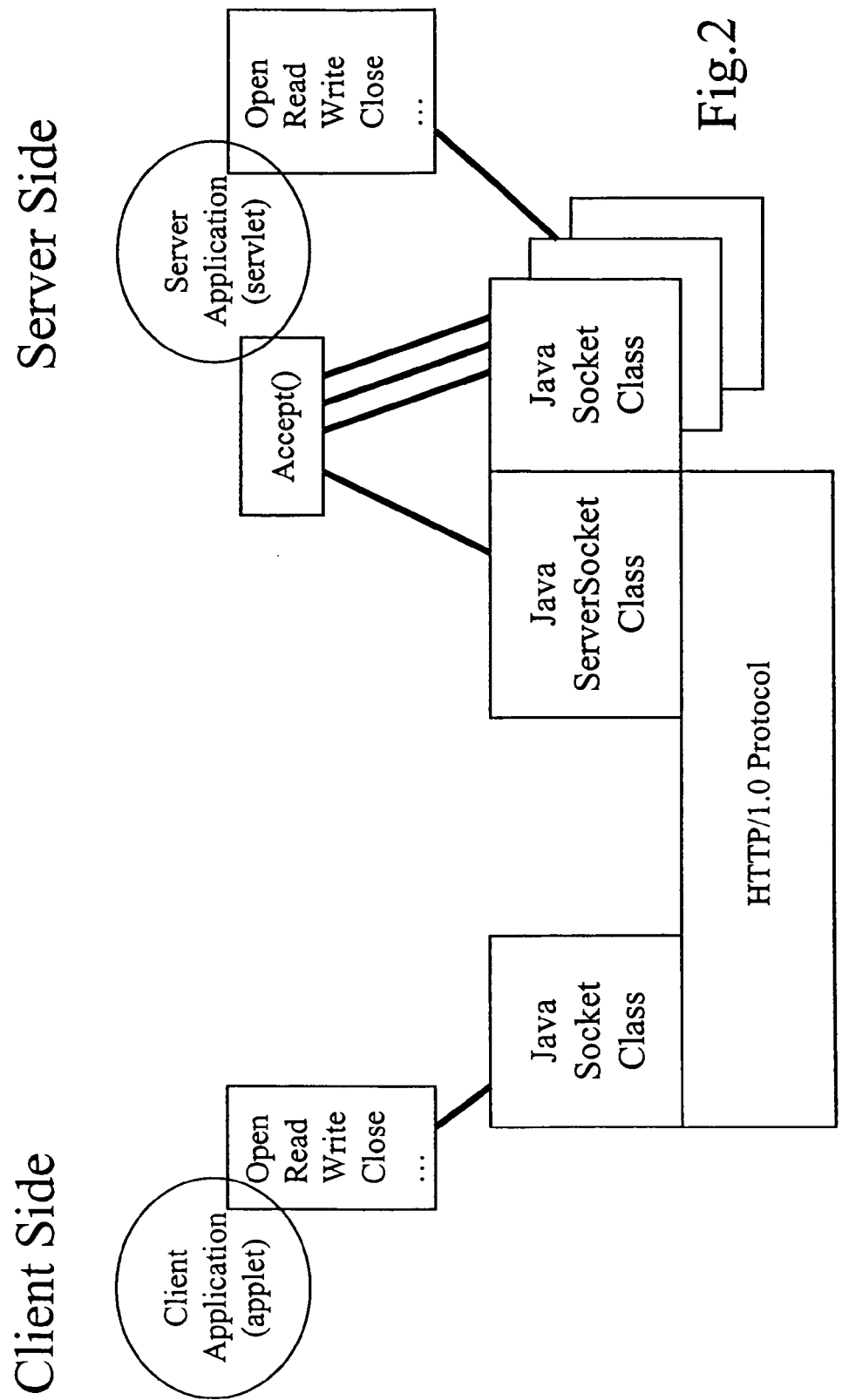
FIG. 2 shows an outline of an implementation of the invention in the Java programming language.

The tunnel consists of two Java programming classes, one (called the TunnelSocket) which implements the "Socket" class as defined in the Java/1.1 specification, and another (called TunnelServerSocket) which implements the "ServerSocket" class defined in that specification. As shown in FIG. 2, client-based Java code can access the standard APIs (such as open, read, write, close, etc.) provided by a class conforming to the Socket class definition to communicate with a another Java application, such as one running on the web server. The server-based Java application can likewise use the same Socket APIs, plus the standard APIs such as accept etc. provided for servlets by the ServerSocket class, to communicate with the client-based Java applet. Messages between the Socket class and the ServerSocket class are carried within HTTP messages which traverse the firewall between the client and the server.

Figure 3:
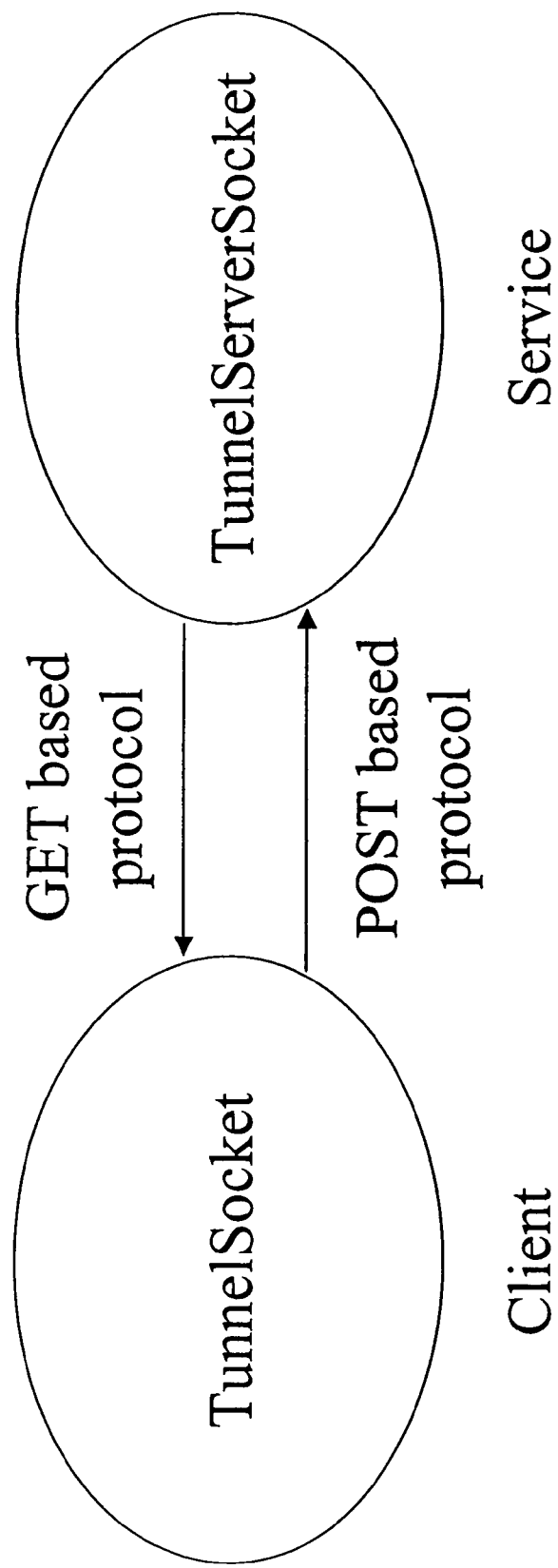
FIG. 3 illustrates the basic principles of operation of the invention.

The HTTP tunnel uses the underlying simple text-based HTTP protocol to produce a reliable connection-based protocol between the TunnelSocket and TunnelServerSocket classes. Basic HTTP transactions use one of two methods in the HTTP request message. The GET method is designed to "get" a web page from a web server and the POST method is used to send data to a remote web resource or web application. In implementing the present invention, a GET based protocol is used for the client to server direction, and a POST based protocol is used for the reverse, server to client, direction, as shown in FIG. 3. In the event that HTTP is supplanted by a functionally equivalent protocol, it is envisaged that the invention could be used with operations in that protocol equivalent to the HTTP GET and POST operations.

A single connection between the TunnelSocket and TunnelServerSocket classes is likely to comprise multiple HTTP transactions. To associate these transactions together, a numeric Globally Unique ID (GUID) is generated using a combination of random numbers, network address and time of day, so that each GUID generated is a unique quantity both in relation to time and location in the network. This GUID is incorporated in each HTTP request, both GET and POST, so that the HTTP protocol can recognize that they relate to the same communications socket. Specifically, the GUID is passed as the HTTP Uniform Resource Indicator (URI) (the field used to specify a document name in normal use of HTTP).

Figure 4:
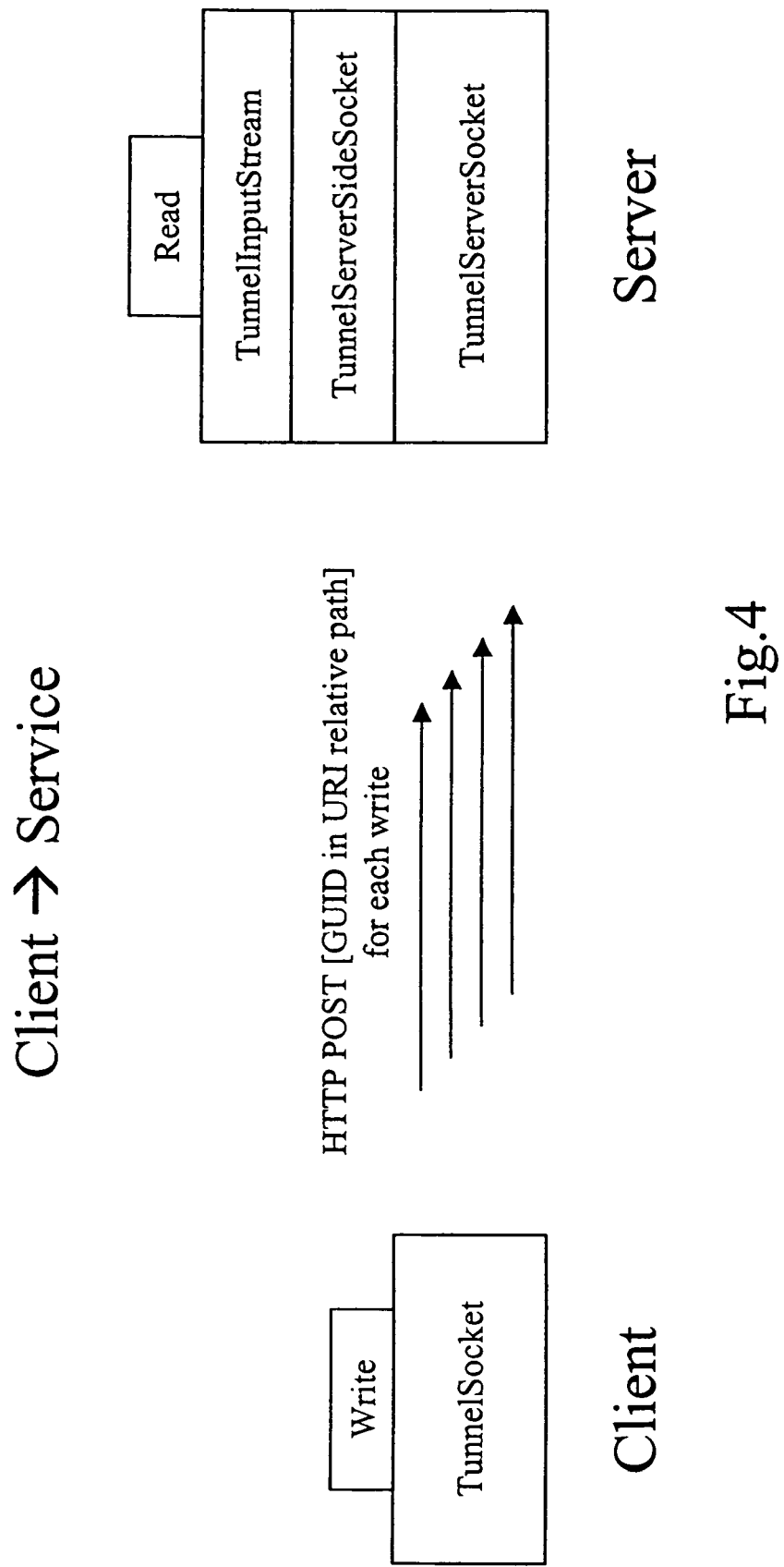
FIG. 4 shows in more detail the mechanism for communications from the client to the server.

Client to server connection is implemented using the POST HTTP operation. Each time a write is performed to the client socket (TunnelSocket class) the request is packaged up and sent as the payload of an HTTP POST message, including the relevant GUID, as shown in FIG. 4. Each such write operation sends a separate POST message through the firewall.

The server to client direction is more complex because of restrictions imposed by the proxy server 12 and the firewall 16. As shown in FIG. 5, the client issues an HTTP GET message which tells the server that a new tunneled socket is being established. The HTTP GET request will generate a temporary server-client socket that allows data to be written from the server to the client. However as a security precaution most proxy server implementations will close down such a server-client socket after a time interval P, typically of the order of ten minutes in duration. Accordingly the tunnel established in this invention periodically itself forces a pre-emptive close down of the connection at some periodicity T which is shorter in duration than the interval P. This is accomplished by issuing another GET request, to force the TunnelServerSocket class to close the existing socket to the client and immediately establish a new socket. It should be noted that this closure (and subsequent re-opening) are performed even though data are still pending to be transferred from the server to the client. This approach avoids the overhead of previous techniques, in which the client polls the server at some preselected polling interval, usually of the order of 20 milliseconds. These frequent polls are equivalent to multiple web page requests, so the server receives a large number of web hits per second, imposing a significant overhead and severely restricting the scalability of such prior techniques to handle large numbers of clients simultaneously.

An illustration of the implementation of the invention is provided below, in the form of pseudo-code, which emphasizes the significant aspects of the implementation but for the sake of clarity omits minor details which, although required in practice, are well within the capability of a person skilled in the art. Likewise the existence is assumed of certain subsidiary functions, such as guidFactory for creating a GUID and createFiFoInputStream for reserving and configuring memory for use as a first-in-first-out (FIFO) buffer; again these functions are individually well known in the art, so their internal details do not need to be specified. Depending on the particular manner of implementation, additional parameters may be included, for example, in some function calls; this is indicated by an ellipsis (. . .).

1. Server to Client Direction.

1a. TunnelSocket InputStream Code - runs on client

```
//
// Open an Input Stream to the Server
// This is the Server to Client direction of the Tunnel Socket.
//
// serverAdresss - Internet address e.g. fred.hpl.hp.com:
//   standard socket
// Port number is a port number on the server machine to
//   connect to: standard socket
public open(serverAddress, portNumber) {
    // Generate a new Globally unique id for the new socket.
    // The id is unique across the whole network and across
    //   time.
    // It is generated using a random number generator, the
    //   node's network address and the current time.
    guid = guidFactory( );
    // Create a Fifo stream that is used by the application code
    //   to read data.
    // The underlying protocol reads data off the wire into this
    //   Fifo ready for the application.
    fifoInputStream = createFiFoInputStream( );
    // Issue an HTTP/1.0 GET request to the server
    // The on-the-wire format is:
    //   GET <guid>?command=establish
    //   Content-Type=application/octet-stream
    inputStream = issueHttpGetRequest(uri=guid,
        queryString="command=establish",
        Content-Type="application/octet-stream",
        address=serverAddress, port=port);
    // Start a timer thread that is invoked at a periodicity of
    //   GETTimeOut seconds.
    // Typically GETTimeOut is a few minutes in duration - but
    //   it must be less than the time out period of the proxy.
    // The function switchGETStream( ) is called at the
    //   periodicity with its own thread of execution.
    startPeriodicTimeOutDemon(switchGETStream( ), GETTimeOut);
}
// Send a new request to the server telling it to close down
```

-continued

1a. TunnelSocket InputStream Code - runs on client

```
//   the current stream and establish a new stream
//   periodically
private switchGETStream( ) {
    // Lock the Input Stream to prevent any race conditions with
    //   readInputStream
    lock(inputStreamLock)
    newInputStream = issueHttpGetRequest(uri=guid,
        queryString="command=switch",
        Content-Type="application/octet-stream",
        address=serverAddress, port=port);
    // Drain the contents of the stream until it is closed by
    //   the remote end
    while (read(InputStream, FifoStream) != EOF);
        writeToFifo(FifoInputStream);
    inputStream = newInputStream( );
    unlock(inputStreamLock);
    return( );
}
// Read data from the stream via the Fifo - the Fifo buffers
//   data up ready to be read
public readInputStream( . . . , buf, len) {
    . . .
    // if there isn't enough data in the Fifo to satisfy this
    //   read request - top it up from the wire.
    if (!FifoStream.length( ) > len) {
        //Transfer data from the stream established to the Server
        lock(inputStreamLock);
        writeToFifo(FifoInputStream, read(InputStream,
            len - FifoStream.length( ));
        unlock(inputStreamLock);
    }
    // return data in from Fifo
    return(read(FifoInputStream, . . . , buf, len)));
}
//
public  close( ) {
    // Stop timer thread
    stopPeriodicTimeOutDemon(switchGETStream( ));
    // Mark stream as closed
    markInputStreamClosed( );
}
```

1b. TunnelServerSocket OutputStream - runs on the server

```
// Server side Protocol engine handling all requests the server receives
// Sit waiting on a ServerSocket for socket connections to come
//   in . . . just standard socket call
    while ((socket = accept( ) still open) {
        httpheader = readHttpHeader(socket);
        if ( httpHeader.type == "GET" &&
            httpHeader.command = establish) {
            // New socket request
            // Open an output Stream
            outputStream = socket.getOutputStream( );
            // Add an entry to the database of opened Tunnel Sockets
            addEntryTunnelSocketHashDataBase(socket, outputStream,
                httpHeader.guid);
        } else ( httpHeader.type == "GET" &&
            httpHeader.command == "switch") {
            // Lookup tunnelSocket
            tunnelSocket =
                lookupEntryTunnelSocketDatabase(httpHeader.guid);
            // Request to switch stream generated by the TunnelSocket
            //   timer on the client
            // Close the current output stream
            // Take lock to avoid conflict with
            //   tunnelOutputStreamWrite
            lock(tunnelSocket.outputStreamLock);
            close(tunnelSocket.outputStream);
            // establish a new output stream on this new connection.
            tunnelSocket.outputStream = socket.getOutputStream( );
            unlock(tunnelSocket.outputStreamLock)
```

-continued

```
1b. TunnelServerSocket OutputStream - runs on the server

} else (httpheader.type == "POST" )
    // See pseudo-code fragment included below with Server-
    //   Client direction.
    doPOST( );
}
tunnelOutputStreamWrite(buf, len) {
...
    // Take lock to avoid conflict with "switch" in
    //   tunnelServerAccept( )
    lock(outputStreamLock)
    write(outputStream, buf, len);
    unlock(outputStreamLock)
}
...
```

```
2. Client-Server direction.

2a. Client side TunnelSocket OutputStream public write(buf, length, . . . ) {
    // Issue an HTTP/1.0 POST request to the server
    // The on the wire format is:
    //   POST <guid>
    //   Content-Type=application/octet-stream
    //   Content-Length=<length>
    inputStream = issueHttpPOSTRequest(uri=guid,
        Content-Length=length,
        Content-Type="application/octet-stream",
        address=serverAddress, port=port, payload=buf);
}

2b. Server side TunnelServerSocket InputStream public readServerSideInputStream(buf, len, . . . ) {
    return(readFromFifo(FifoServerSideInputStream, buf, len, . . . );
}
...
// On receiving a POST request (see 1b above)
// copy the payload into the Fifo buffer ready for the
//   readServerSideInputStream to read it.
doPOST( ) {
    writeToFifo(FifoServerSideInputStream,
        httpRequest.readPayLoad( ), httpHeader.contentLength);
}
...
```

The invention claimed is:

1. A method of communication between a service external to a network firewall and a client internal to the firewall, comprising the steps of:
   (a) effecting an HTTP request from the client to the service, this request including an identifier;
   (b) at the service, in response to said HTTP request, establishing a communications socket at the service for communicating data between the service and the client, and recording an association between the identifier and said socket;
   (c) after a predetermined time interval, effecting a further HTTP request from the client to the service, said further HTTP request including said identifier;
   (d) at the service, in response to said further HTTP request, closing the communications socket indicated in said association, opening a new communications socket at the service for communicating data between said service and the client, and updating said association to associate the new communications socket with said identifier; and
   (e) repeating steps (c) and (d) while access between the service and the client is to continue; the service providing data to the client via the communications socket currently associated with said identifier by said association.

2. The method of claim 1, wherein the predetermined time interval is set with reference to a specific time interval after which a proxy server on the client-side of the firewall is arranged to enforce termination of a communications socket through which the service communicates with the client, said predetermined time interval being set to be less than said specific time interval.

3. The method of claim 1, wherein the HTTP requests are GET operations.

4. Apparatus for communicating with a service via a proxy server arranged to force, after a specific time interval, termination of a communications socket through which communication between the apparatus and the service takes place, said apparatus comprising:
   a communications interface for interfacing the apparatus with a network;
   a first control arrangement for using the communications interface to effect a first HTTP GET operation with respect to said service, thereby to cause the latter to establish a communications socket for communicating data between the service and the client, said GET operation being arranged to pass a globally unique identifier to the service;
   a second control arrangement for using the communications interface to repeatedly effect another GET operation sending said globally unique identifier to said service for a predetermined time interval, less than said specific time interval, after a most recent GET operation effected by the apparatus with respect to said service, thereby to cause the service to close said existing communications socket and to open a new communications socket for communicating data between said service and the client; and
   a third control arrangement for causing the second control arrangement to terminate its operation when access between the service and the client is no longer required.

5. A server comprising:
   a communications interface for receiving HTTP requests from a client;
   a first control arrangement arranged to identify HTTP requests of a first type and of a second type where each of these request types includes a globally-unique identifier;
   a second control arrangement arranged to respond to an HTTP request of said first type by establishing a communications socket at the server for communicating the requested data between the server and the client, and by recording an association between the identifier included in the HTTP request and the communications socket;
   a third control arrangement arranged to respond to an HTTP request of said second type to close the communications socket indicated by the said association recorded in respect of the identifier included in the HTTP request, the third control arrangement being further arranged to open a new communications socket at the server for communicating data between the server and the client, and to update said association to associate said identifier with the new communications socket; and
   a fourth control arrangement arranged to provide data to the client via the communications socket currently associated with the identifier in the HTTP request by the corresponding said association.

* * * * *